United States Patent
Tehrani et al.

(10) Patent No.: US 6,177,483 B1
(45) Date of Patent: Jan. 23, 2001

(54) SETTING COMPOSITION FOR WELL OPERATIONS

(75) Inventors: Mostafa A Tehrani, St. Austell; Stephen N Davies, Over; Geoffrey C Maitland, Foxton, all of (GB)

(73) Assignee: Schlumberger Technology Corporation, Sugar Land, TX (US)

(*) Notice: Under 35 U.S.C. 154(b), the term of this patent shall be extended for 0 days.

(21) Appl. No.: 09/269,994

(22) PCT Filed: Sep. 30, 1997

(86) PCT No.: PCT/GB97/02686

§ 371 Date: May 25, 1999

§ 102(e) Date: May 25, 1999

(87) PCT Pub. No.: WO98/14690

PCT Pub. Date: Apr. 9, 1998

(30) Foreign Application Priority Data

Oct. 3, 1996 (GB) .................................. 9620638

(51) Int. Cl.[7] .................. C08J 3/00; C08K 3/20; C08L 9/00; E21B 33/13; C09K 7/00

(52) U.S. Cl. .................. 523/130; 166/294; 166/337; 523/131; 523/335; 524/191; 524/210; 524/213; 524/263; 524/284; 524/315; 524/319; 528/486; 528/487; 528/488; 528/490; 528/491; 528/492

(58) Field of Search .................. 523/130, 131, 523/335; 166/337, 294; 524/191, 210, 213, 284, 263, 315, 319; 528/487, 486, 488, 490, 491, 492

(56) References Cited

U.S. PATENT DOCUMENTS 4,649,998  3/1987  Friedman .
5,061,387  10/1991  Victorius .
5,130,191  7/1992  Pole .

FOREIGN PATENT DOCUMENTS 829871   5/1981  (SU) .
972047  11/1982  (SU) .
1627667  2/1991  (SU) .

*Primary Examiner*—Patrick D. Niland
(74) *Attorney, Agent, or Firm*—Robin C. Nava

(57) ABSTRACT

A composition and uses of said composition are described for a latex based setting system for remedial and other operations within a wit bore. The composition comprises a pH-reducing agent and/or a coagulant. By controlling the amount of agent, the setting time of the system can be controlled in a range of 0.5 h to 15 h.

11 Claims, 2 Drawing Sheets

SETTING COMPOSITION FOR WELL OPERATIONS

The present invention relates to a latex-based setting composition for completion and remedial operations, such as sealing, cementing or isolating, performed in subterranean zones penetrated by a borehole.

BACKGROUND OF THE INVENTION

In the development, completion, and operation of natural hydrocarbon reservoirs, various setting systems are in use.

These systems are used for sealing or cementing the region between metal casing and the formation wall. Other applications include the hydraulic isolation of abandoned or productive zones as described for example in the published International patent application WO-9500739.

The known setting systems are based on either cementitious materials, e.g. cements, particularly Portland cements, blast furnace slag, fly ash/lime mixes and mixtures of these materials, on other ceramic-forming materials, or on polymer materials, such as thermosetting polymers.

Cement-based setting compositions are known for example from U.S Pat. Nos. 4,721,160 and 5,258,072. In some of the known compositions a styrene/butadiene latex is added to the cement in order to impart certain desirable properties, such as fluid loss control, to the composition.

A rubber latex based composition for use in completion or remedial operations in subterranean formations or wellbores is described in the U.S. Pat. No. 5,159,980. The disclosed compositions are comprised of an aqueous dispersion of rubber, a vulcanizing agent and a vulcanization activator. A solid rubber plug or seal is formed therefrom by allowing the compound to vulcanize. The known composition is not thixotropic and therefore not applicable for important operations in horizontal wells.

U.S. Pat. No. 4,649,998 describes a rubber based emulsion for consolidating sand particles. The emulsion also contains an ester which by hydrolysation reduces the pH of the emulsion and thus causes the nitrile rubber to coat the sand grains. The known emulsion is highly specifically designed for sand consolidation and has little use in many other remedial operations, e.g. for plugging formation and the like.

In view of the ever increasing demand for improved well completion and remedial operation techniques, it is an object of the present invention to provide a latex-based setting composition which can be adjusted to a broad range of setting times.

Another object of the present invention is to provide a setting system for wellbore application with improved pumpability. Various well completion and remedial operation require the setting system to be pumpable through small holes, gravel packers, or slotted liners. In particular for coiled tubing, where the diameter of the drill string is small compared to conventional drill strings, the known compositions often suffer a significant frictional pressure drop.

SUMMARY OF THE INVENTION

The above-mentioned objects are achieved by a composition as set forth in the appended claims.

It is regarded as an important feature of the invention that the new composition is latex-based i.e., its main dry component is a latex. Preferably the part of the latex in the dry weight of the composition is larger than 50%, and most preferably larger than 70%.

In contrast to most of the known compositions for use in subterranean zones, the composition in accordance with the present invention is not based on cementitious materials, such as limestone, chalk, marl etc. Some preferred formulations are essentially free from any calcareous additives, though argillaceous components might be added to impart thixotropic properties to the composition. A preferred embodiment of the invention is characterized in that the mean particle size is below 10 microns, preferably below 1 micron. The mean is defined herein as in general statistics. The pumpability of these "solid- free" compositions is significantly improved.

In other known latex-based compositions, such as described in U.S. Pat. No. 5,159,980, a solid rubber plug or seal is formed by a process known as "vulcanization". The vulcanization process involves the chemical cross-linking of polymer chains by covalent bonding, usually through sulfur bridges. In the present invention the latex-based composition is solidified by a process known as "coagulation". The coagulation process is caused by a destabilization of the latex emulsion, that leads to an aggregation of the latex particles or colloids without forming a chemical bond between adjacent polymers. Although coagulation is used as the sole, or predominant method, the use of conventional cross-linking as an auxiliary bonding mechanism can be advantageous for applications which require a setting system with a high mechanical strength.

The latex component in the composition can be chosen from any latex material which is capable of forming a solid in a controllable setting time, in particular at high temperatures.

High temperatures in the context of the present invention are defined as temperatures in the range of 40 to 150_C at pressures up to 1000 bar and possibly higher. Suitable latices include natural and synthetic rubbers, in particular anionic variants thereof. For example, natural rubber (cis-1,4-polyisoprene) in most of its modified types can be utilized.

Synthetic polymers of various types can also be used including styrene-butadiene rubber (SBR), cis-1,4-polybutadiene rubber and blends thereof with natural rubber or styrene-butadiene rubber, high styrene resin, butyl rubber, ethylene-propylene rubbers (EPM and EPDM), polychloroprene rubber, nitrile rubber, cis-/tr-1,4-polyisoprene rubber, silicone rubber, chlorosulfonated polyethylene rubber, epichlorohydrin rubber, fluorocarbon rubber, fluorosilicone rubber, polyurethane rubber, polyacrylic rubber and polysulfide rubber.

It is also feasible to combine two or more latices so as to provide a composition or blend optimized for a specific operation.

The setting time for a composition in accordance with the invention is at least 2 h and possibly up to 8 h or more. It is seen as a further characteristic feature of the present invention that the composition comprises a pH-reducing agent that is adapted to lower within a pre-determined time period the pH of the latex emulsion to one at which the latex coagulates.

The pH-reducing agent reduces the initially high pH value (>10) of an anionic latex emulsion, thus accelerating and facilitating its coagulation. Suitable agents are slowly reacting acids or buffering materials which stabilize the pH at lower values, preferably between 8 and 9.

Preferred pH reducing reactants can be selected from a group comprising ester or amides of water soluble acids that preferably hydrolyze at moderate rates at reservoir temperatures. Suitable reactants include amides of soluble carboxylic acids, such as formamide, urea, acetamide, dimethyl formamide, 2-chloroacetamide; amides of sulfonic acids, such as methane sulfonamide; inorganic acids amides, such as sulfamide; water soluble esters of water soluble organic acids, such as methyl acetate, methyl gallate, the acetates of alcoholes, glycols, or hydroxy compounds; water soluble and readily hydrolysable organic halides, such as sodium trichloride, methyle iodide, sodium monochloroacetate, or 3-chloro-1-propanol.

The control of the setting time is improved by combining the pH reducing agent with an internal coagulant or latex gelling agent. Usually a coagulant is applied to destabilize the latex emulsion and hence causing the formation of a solid rubber.

Suitable coagulants can be selected from a group comprising sodium or potassium silicofluorides, and ammonium salts, such as ammonium nitrate, chloride, or sulfate. Some of these coagulants are effective at elevated temperatures, i.e., above room temperature. The amount of added coagulants ranges from 1 to 10 weight parts per hundred of dry rubber (phr), preferably from 1 to 5 phr.

It is regarded as an important advantage of the present invention that by adjusting the respective concentration of coagulant and pH-reducing agent it is possible to control the setting time of the composition. Achievable delay times for the setting process range from 0.3 h to 15 h. This property mitigates the impact of any forced or deliberate interruption in pumping.

A particular additive which is considered to be important for a broad variety of applications are thixotropes which impart thixotropic properties to the composition. In a preferred embodiment of the invention, the thixotrope is selected from a number of known thixotropic substances, particularly from strongly interacting particulate and molecular species. In the first case, the thixotrope conveniently comprises a fine grained (having a mean particle size with maximum dimension of less than 1 micron) inorganic colloid, particularly fine grained clays, especially smectite clays, e.g. hectorites, or colloidal silica. Other suitable thixotropes include polymer materials, such as cellulose, guar, and polyacrylates.

The thixotropic variant of the invention can advantageously be used in both vertical and horizontal wellbores. Its thixotropic properties prevent the composition from sagging under gravity; thus making it useful even for operations in extended horizontal wells, where known compositions fail.

There are many agents, such as stabilizers, which can be added to latices in order to produce finished products for different applications. Useful stabilizers include anionic, nonionic and amphoteric substances. The kind and amount to be used in the composition depends on the complexity of the compound and the processing requirements. Preferably, nonionic stabilizers, such as octylphenol polyether alcohols with varying numbers of ether linkages per molecule, and cloud points from below freezing to over 100 degrees Celsius are used.

Further additives to the composition may include metal oxides to act as acid acceptors and to improve heat resistance. Further, there can be added antioxidants to the composition to prevent oxidation which causes chain scission and the formation of undesired cross-links.

Other possible additives include accelerators which promote the curing of the latex, fillers and bonding agents. The latter are used with advantage for improving the adhesion of the latex composition to a substrate, such as steel or layers of the subterranean formation.

These and other features of the invention, preferred embodiments and variants thereof, possible applications and advantages will become appreciated and understood by those skilled in the art from the detailed description and drawings following below.

DRAWINGS

EXAMPLES

Figure 1:
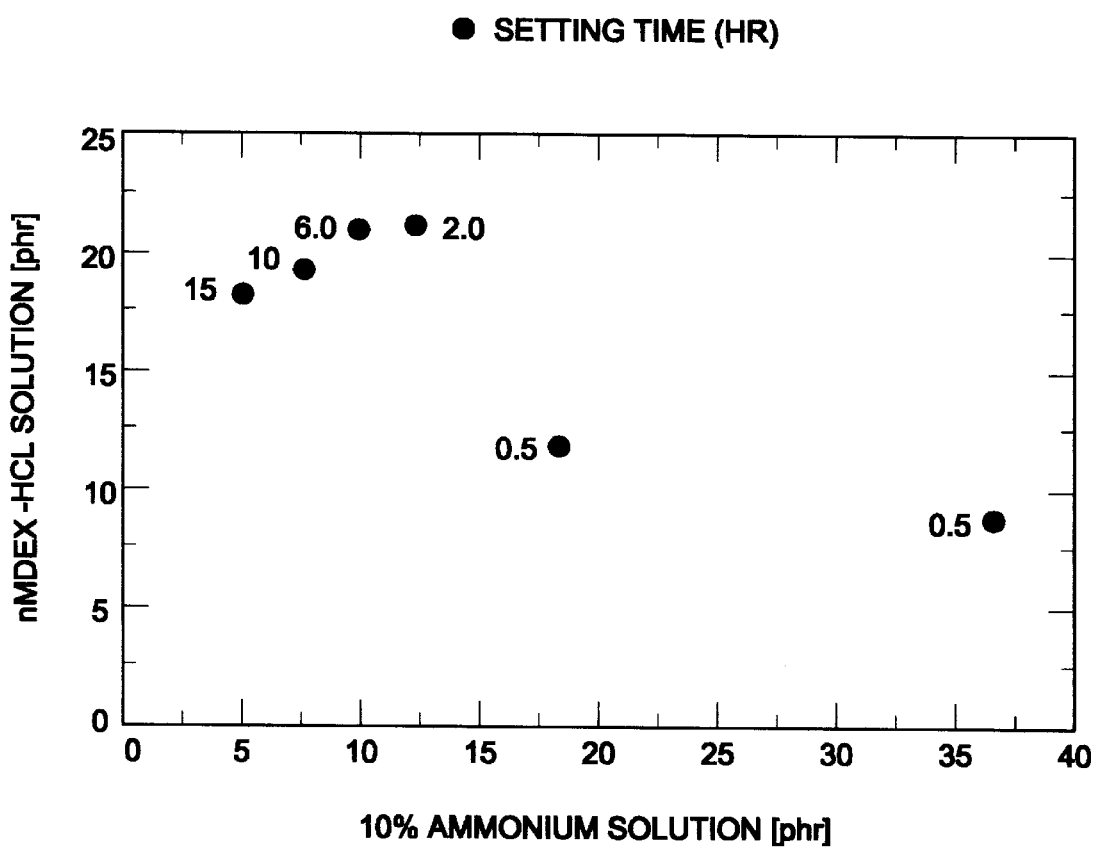
FIG. 1 shows setting times of a composition in accordance with the invention in dependence of the amount of pH-reducing agent (nMDEA-HCL) and coagulating agent (ammonium solution)

As indicated above, a variety of well known rubber or latex materials can be utilized for forming compositions useful within the context of the present invention.

The rubber materials are commercially available in latex form, i.e., as aqueous dispersions or emulsions which are utilized directly and to,which the other components or additives of the composition are added. Best result have been achieved with commercially available anionic variants of neoprene (polychloroprene).

An anionic neoprene latex used in the examples below is characterized by the following properties:

Primary monomer: Chloroprene
Co-monomer: 2,3-dichloro-1,3 butadiene
Emulsifier: Anionic potassium salts of disproportionated resin acids
Chlorine content: 48% (wt)
pH at 25° C.: 12
Solid content: 50% (wt)
Viscosity: 9 cP
Specific gravity
(at 25° C.): 1.14
Mean particle size: 120 nm Suitable nonionic stabilizers are used which are commercially available, for example under the trade name Triton X (Union Carbide), a octylphenol polyether alcohol with varying numbers of ether linkages per molecule, and cloud points from below zero to above 100 degrees Celsius, The stabilizers are usually added in concentrations ranging from 0.5 to 2 phr.

Examples suitable for use as antioxidants are staining agents, such as being available under the trade names Neozone (DuPont) and AgeRite White (R.T. Vanderbilt), or non-staining agents, such as substituted or hindered phenol compounds available under the names Antioxidant 2246 (American Cyanamid) or Santowhite Crystals (Monsanto Chemicals). The amount of antioxidants added to the composition may range from 1 to 5 phr.

Organic accelerators which are most effective for neoprene latex composition include thiocarbanilide, either alone or in combination with diphenylguanidine. Suitable fillers include feldspar in dry powder form or ball-milled slurries of clay added in amounts of zero to 20 phr.

Bonding agents, such as terpene phenolic resins, can be utilized at concentrations between 10–75 phr to improve the adhesive properties of the composition.

The following examples are compounded in a beaker equipped with a magnetic stirrer. The sequence of components as appearing in the respective tables reflects the sequence in which those components were added to the latex emulsion. Pre-prepared agents are separated by blank lines.

The setting time at elevated temperatures is determined by placing samples of the composition in an oven heated to 120° C. A sample is examined at intervals by tilting and gently shaking. The time at which the sample appears immobile is taken as the setting time.

A first example of a non-thixotropic composition in accordance with the present invention is given in the following table (all quantities in weight):

TABLE 1

| Compound | Dry | Wet |
| --- | --- | --- |
| Neoprene Latex | 100 | 200 |
| Triton X-100 (undiluted) | 1.26 | 1.26 |
| Water | — | 3.78 |
| HCl (36.5%) | 1.18 | 3.23 |
| nMDEA | 5.03 | 5.03 |
| Triton X-100 (undiluted) | 0.06 | 0.06 |
| Water | — | 12.87 |
| (pH) | | (10) |
| NH4Cl | 0.04 | 0.04 |
| NH4NO3 | 0.04 | 0.04 |
| Triton X-100 (undiluted) | 0.18 | 0.18 |
| Water | — | 0.74 |
| (pH) | | (9.5) |
| Total | 107.79 | 227.23 |
| (47.4% of dry material) | | |

The flexibility in controlling the setting time of the compounds is illustrated in FIG. 1, which shows variations of the setting time (measured at 120 degrees Celsius) versus concentration (in phr) of the pH-reducing agent (nMDEA-HCl) and the ammonium salt (10% solution). The numbers on the plot denote the various setting times in hours. Clearly, a balance between pH-adjustment and coagulating agent can be used advantageously to control the setting time of the composition.

The following table describes a further example of a non-thixotropic composition in accordance with the invention.

TABLE 2

| Compound | Dry | Wet |
| --- | --- | --- |
| Neoprene Latex | 100 | 200 |
| Triton X-100 (undiluted) | 1.26 | 1.26 |
| Water | — | 3.78 |
| A12M | 8.0 | 16.0 |
| (pH) | | (12.7) |
| HCl (36.5%) | 1.18 | 3.23 |
| nMDEA | 5.03 | 5.03 |
| Triton X-100 (undiluted) | 0.06 | 0.06 |
| Water | — | 12.87 |
| (pH) | | (10.3) |
| NH4Cl | 0.2 | 0.2 |
| NH4NO3 | 0.2 | 0.2 |
| Triton X-100 (undiluted) | 0.9 | 0.9 |
| Water | — | 3.8 |
| (pH) | | (10.0) |
| Total | 116.83 | 247.33 |
| (47.2% of dry material) | | |

In this example a composite dispersion (A12M) is used containing 50% active ingredients consisting of ZnO, antioxidant (a polymerized hydroquinoline compound), accelerator (thiocarbanilide/diphenylguanidine) and sulfur. This dispersion effectively accelerates the setting process itself without, however, affecting the ability to control the onset of the setting, i.e., the setting time by altering the amount of the pH-adjusting agent and coagulant.

In a further example, an aqueous dispersion of a modified terpene phenolic resin containing 50% active ingredients, is added to the composition. This adhesion promoter is commercially available under the trade name Dermulsene 92 (Marlin Chemicals). The complete formulation of the composition consists of:

TABLE 3

| Compound | Dry | Wet |
| --- | --- | --- |
| Neoprene Latex | 100 | 200 |
| Triton X-100 (undiiuted) | 1.26 | 1.26 |
| Water | — | 3.78 |
| Dermulsene 92 | 30 | 60 |
| HCl (36.5%) | 1.17 | 3.20 |
| nMDEA | 4.98 | 4.98 |
| Triton X-100 (undiluted) | 0.06 | 0.06 |
| Water | — | 12.75 |
| NH4Cl | 0.4 | 0.4 |
| NH4NO3 | 0.4 | 0.4 |
| Triton X-100 (undiluted) | 1.78 | 1.78 |
| Water | — | 7.52 |
| (pH) | | (9.53) |
| Total | 140.05 | 296.13 |
| (47.3% of dry material) | | |

This example shows good adhesion properties with respect to steel. Hence this or similar compositions may be utilized to protect steel casing and/or liners in awellbore for example from corrosive processes. Dermulsene 92 can be replaced in the 35 composition by similar products, such as Durez 12603 (Cornelius Chemical) or aqueous anionic dispersions of modified resin, available as Snowtack SE380G (Akzo Nobel).

In the following, an example of a thixotropic composition in accordance with the invention is described in greater detail.

Suitable thixotropes which impart thixotropic properties to the basic composition while maintaining the ability to control the setting time over a broad range are found to be synthetic trioctahedral smectites similar to the natural clay hectorite. These materials are available in various modifications under the trade name Laponite (Laporte Industries). The variant (Laponite JS) used in the following examples is a layered hydrous sodium lithium magnesium silicate modified with tetrasodiumpyrophosphate. It is in the form of a free-flowing powder which is easily dispersed in water. Laponite JS forms a stable sol in water at concentrations below approximately 20% by weight. The individual clay platelets in the sol are about 250 Å in diameter and about 10 Å thick with a negative face charge and a positive edge charge.

The components of the thixotropic composition are listed in the following table:

TABLE 4

| Compound | Dry | Wet |
| --- | --- | --- |
| Neoprene Latex | 100 | 200 |
| Triton X-405 (70%) | 2.54 | 3.63 |
| Water | — | 6.54 |
| Urea | 1.8 | 1.8 |
| Laponite JS (20% solution) | 9.3 | 46.5 |
| A12M (50% composite dispersion) | 3.5 | 7.0 |
| NH4Cl | 0.32 | 0.32 |
| NH4NO3 | 0.32 | 0.32 |
| Triton X-405 (70%) | 0.64 | 0.91 |
| Water | — | 3.54 |
| Total | 118.42 | 270.56 |
| (43.8% of dry material) | | |

The given formulation displays a gel strength of 230 Pa upheld for at least 90 minutes whilst under shear at a steady rate of 375 s$^{-1}$ at room temperature. The same formulation provided a setting time of about 4 hours at 120_C.

Another example in which the pH-reducing agent urea is replaced by nMDEA-HCl is given in the following table:

TABLE 5

| Compound | Dry | Wet |
| --- | --- | --- |
| Neoprene Latex | 100 | 200 |
| Triton X-405 (undiluted) | 1.26 | 1.26 |
| Water | — | 3.78 |
| A12M | 7.0 | 14.0 |
| HCl (36.5%) | 0.37 | 1.02 |
| nMDEA | 1.59 | 1.59 |
| Triton X-405 (undiluted) | 0.02 | 0.02 |
| Water | — | 4.07 |
| NH4Cl | 0.24 | 0.24 |
| NH4NO3 | 0.24 | 0.24 |
| Triton X-405 (undiluted) | 1.06 | 1.06 |
| Water | — | 4.46 |
| Laponite JS | 9.50 | 9.50 |
| Water | — | 47.4 |
| Total | 121.28 | 288.64 |
| (42.0% of dry material) | | |

A further example of a thixotropic composition with good mechanical stability is given in the following table:

TABLE 6

| Compound | Dry | Wet |
| --- | --- | --- |
| Neoprene Latex | 100 | 200 |
| Triton X-405 (undiluted) | 1.26 | 1.26 |
| Water | — | 3.78 |
| Texigel | 0.4 | 2.5 |
| Urea | 3.0 | 3.0 |
| A12M | 7.0 | 14.0 |
| NH4Cl | 0.40 | 0.40 |
| NH4NO3 | 0.40 | 0.40 |
| Triton X-405 (undiluted) | 1.13 | 1.13 |
| Water | — | 4.05 |
| Laponite JS | 9.78 | 9.78 |
| Water | — | 39.12 |
| Total | 123.37 | 279.42 |
| (44.1% of dry material) | | |

The above described compositions can be utilized for well completion operations, such as the primary bonding of casing and liner in the wellbore, preventing corrosion of steel pipes, or consolidating gravel packs or incompetent sands in formations. They are also suitable for remedial operations, such as sealing leaks, cracks, or voids either in the formation or in casing and liners, placing plugs in the wellbore or in zones or formations containing undesirable fluids, placing temporary plugs in lieu of packers to isolate zones or formations, or filling external casing packers.

Compositions in accordance with the invention are stable even after a prolonged period of pumping (>3.5 h). It was further demonstrated by pumping the composition through an API filtration cell containing a bed of 20/40 mesh sand that the compositions can be pumped or injected through gravel packs, pre-packed screens, perforated liners, and the like without suffering a significant pressure loss or change of its thixotropic or setting properties.

The yield stress of the thixotropic latex compound was measured by means of a vane attached to a torque gauge. Approximately 250 ml of the latex compound was placed inside an API filtration cell. The top plate of the cell was specially adapted to allow a rotatable rod through the center. A seal mechanism around the rod ensured good isolation when the cell was pressurized. A 6-bladed vane (25 mm diameter×25 mm long) was attached to one end of the metal rod (inner side), while to the other end we attached a torque gauge. Once the cell was assembled, it was placed inside a heating jacket. The temperature was set and time was given for the sample to reach thermal equilibrium. To measure the yield stress, the torque gauge was rotated by 90–180 in a slow and steady manner. The maximum reading of the torque gauge was then converted to a yield value (in Pa) by using the calibration constant of the vane in use. For each sample, measurements were made at intervals and at different temperatures. A sharp increase in the yield value was taken to indicate the setting of the latex.

To improve the stability of the latex compound for the measurement of yield stress at higher temperatures, the ammonium solution and A12M were eliminated from the formulations. The compounds still set into-a strong rubber in the absence of the coagulant and A12M.

A summary of the formulations used in the yield stress measurements is given in Table 7.

TABLE 7

| Compound | Sample A | Sample B |
| --- | --- | --- |
| Neoprene Latex | 200 | 200 |
| Triton X-405 (25% solution) | 7.5 | 7.5 |
| Urea | 2.0 | 2.0 |
| Laponite JS (20% solution) | 9.78 | 9.78 |
| Final state | set (5.5 h) | set (2.5 h) |

The compositions produce static yield values in the range 150–280 Pa at room temperature.

Figure 2:
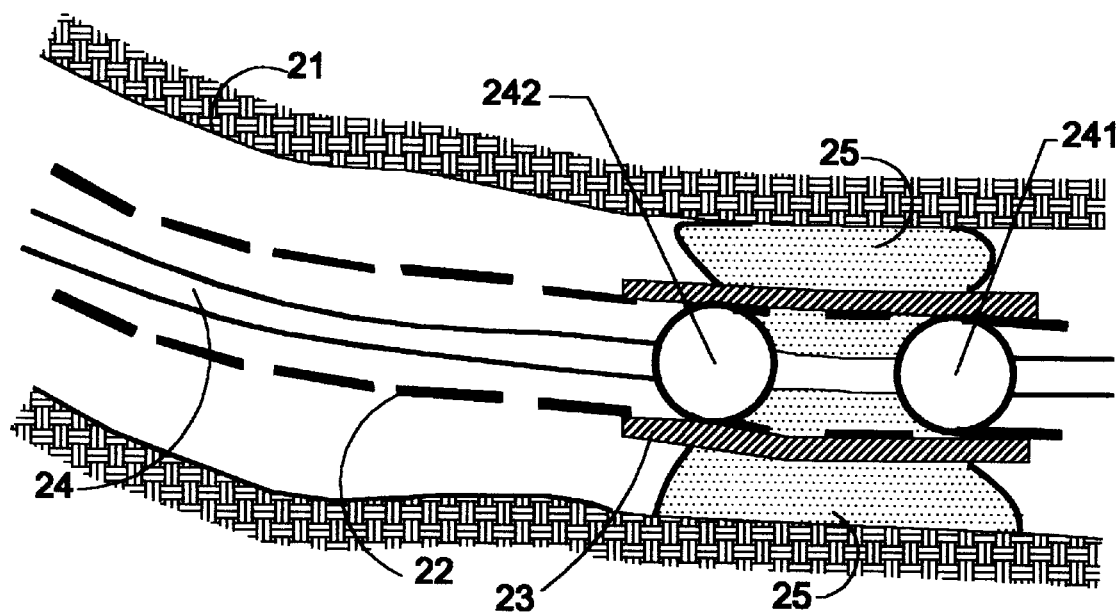
FIG. 2 illustrates a possible application of a composition in accordance with the invention.

The compositions according to the invention are for example useful in placing packers so as to selectively isolate zones in horizontal wells. FIG. 2 schematically illustrates the placing of a packer using coiled tubing. In the figure a horizontal well 21 is shown. Within the well there is a slotted liner 22 surrounded by a pre-packed screen 23. To place the packer, the well is reentered using a coiled tubing tool 24, which comprises a pair of inflatable and retrievable packers 241, 242. After inflating the pair of packers, a thixotropic composition 25 in accordance with the present invention is pumped through the tube into the volume defined by the pair of packers. Due to the viscosity of the composition and the small size of the particles contained therein, the latex composition can be injected through the pre-packed screen 23, thus filling the annular volume between the pre-packed screen and the formation. The high gel strength prevents significant gravity-induced sagging of the composition until the composition sets. The described process can be repeated at a different location in the well so as to isolate unproductive zones. For further details of the method reference is made to WO-9500739.

What is claimed is:

1. A latex based setting composition for completion or remedial operations in subterranean zones penetrated by a borehole, said composition comprising at least 50% part of latex in the dry weight, a coagulating agent and a pH-reducing agent, and having a setting time of 0.3 to 15 hours.

2. The composition of claim 1, wherein the part of latex in the dry weight exceeds 70%.

3. The composition of claim 1, wherein the latex is polyisoprene or polychloroprene.

4. The composition of claim 1 wherein the coagulating agent is selected from a group consisting of salts of multivalent metals, ammonium-based salts, and silicoflourides.

5. The composition of claim 1 wherein the coagulating agent is added in concentrations of 1–10% in the dry weight.

6. The composition of claim 1 wherein the pH-reducing agent is a reactant hydrolyzing at reservoir temperatures.

7. The composition of claim 1 wherein the pH-reducing agent is selected from a group consisting of amides of soluble carboxylic acids, amides of sulfonic acids, water soluble esters of water soluble organic acids, the acetates of alcohols, glycols or hydroxy compounds, and water soluble and hydrolysable organic halides.

8. The composition of claim 1, wherein the part of cementitious material in the dry weight is below 10%.

9. The composition of claim 1, being essentially free from cement.

10. The composition of claim 1, further comprising a thixotrope.

11. A method of forming a temporary or permanent plug, seal or layer in a wellbore comprising a metal casing surrounded by a formation wall, comprising the steps of compounding an emulsion comprising at least 50% part of latex in the dry weight, a coagulating agent and a pH-reducing agent, and having a setting time of 0.3 to 15 hours;

pumping said compounded emulsion into the wellbore; and letting said emulsion set in the volume between said metal casing and said formation wall.

* * * * *